United States Patent [19]
Lewis, Sr.

[11] 3,881,400
[45] May 6, 1975

[54] FLUIDIC OPERATED VALVE ACTUATOR

[75] Inventor: Frank D. Lewis, Sr., Atlanta, Ga.

[73] Assignee: Lockheed Aircraft Corporation, Burbank, Calif.

[22] Filed: Feb. 27, 1973

[21] Appl. No.: 336,255

Related U.S. Application Data

[62] Division of Ser. No. 6,980, Jan. 28, 1970, abandoned.

[52] U.S. Cl. ............................ 92/52; 92/63; 92/64
[51] Int. Cl. .............................................. F01b 7/20
[58] Field of Search ............... 92/62, 63, 64, 65, 52, 92/51

[56] References Cited
UNITED STATES PATENTS

| | | | |
|---|---|---|---|
| 2,134,227 | 10/1938 | Forkardt | 92/140 |
| 2,178,953 | 11/1939 | Chilton | 92/98 D |
| 2,358,826 | 9/1944 | Purat | 92/51 X |
| 2,831,464 | 4/1958 | Lillquist | 92/62 X |
| 2,934,380 | 4/1960 | Julier et al. | 92/64 X |
| 3,187,640 | 6/1965 | Young et al. | 92/63 X |

FOREIGN PATENTS OR APPLICATIONS

| 1,184,741 | 2/1959 | France | 92/63 |
|---|---|---|---|

*Primary Examiner*—Irwin C. Cohen
*Attorney, Agent, or Firm*—George C. Sullivan; Albert L. Carter

[57] ABSTRACT

An actuator having a cylindrical housing in which a reciprocable piston assembly, separating a fluid pressure compartment from an operating compartment when actuated engages a force multiplying means of radial lever arms to move an operating rod.

A second embodiment provides a fail-safe feature of dual concentrically mounted reciprocable pistons each of which may be independently operated.

2 Claims, 5 Drawing Figures

INVENTOR.
FRANK D. LEWIS, SR.

FLUIDIC OPERATED VALVE ACTUATOR

This is a division of application Ser. No. 6,980, filed Jan. 28, 1970, and becoming abandoned as of the filing date accorded this application.

This invention relates in general to valve actuators and more particularly to an actuator to control, by force amplification, large hydraulic valves and like devices with low-pressure fluid circuits.

It is quite common in hydraulic systems, especially in aircraft applications, to utilize small valves to control the actuation of large hydraulic valves. Thusly, the control power is small and the cost and weight of the control power system is minimized. Most four-way directional control valves which are in common use utilize two small pilot valves to control the position of the large valve. One pilot valve is operated to cause the main valve to move an actuator in one direction while the other pilot valve is operated to move the actuator in the reverse direction, depending upon which pilot valve is being operated. On current technology airplanes there may be a requirement to incorporate approximately a hundred or more pilot valves.

It is also the current practice to operate the pilot valves wiith state-of-the-art electrical solenoids with the control circuit being electrical. However, as is easily recognized, the use of electrical solenoids requires heavy equipment since the solenoid is made of relatively heavy coils of wire which are inherent in the design of a solenoid. Since weight is especially detrimental to aircraft performance, and since the reduction of weight, wherever possible, is of the greatest priority, it has been found to be desirable to eliminate heavy solenoids where possible. Recent developments in fluidic technology have indicated that fluidic control circuits offer, in addition to weight reduction, improved reliability, cost, and maintenance characteristics as opposed to solenoid control circuits, especially when utilized to operate hydraulic valves.

It is therefore an object of this invention to provide a fluidic actuator having optimum weight, envelope producibility, and reliability. The present invention provides a diaphragm-operated fluidic actuator incorporating mechanical amplification and is used to operate hydraulic valves in the same way that solenoids are used and electrically controlled circuits. The invention will provide a mechanical lever arrangement to achieve force amplification that results in an optimum-size device to interface between low-pressure fluidic circuits and high-pressure hydraulic circuits.

Generally, the actuator in one of the disclosed embodiments comprises principally a flexible diaphragm, of bellows configuration, which is so configured that the operating fluid admitted through the inlet is prevented from completely filling the housing with fluid because the diaphragm is interposed between the fluid inlet and the housing interior. The diaphragm also is anchored against a piston which moves longitudinally of the housing upon fluid being admitted against the diaphragm. The piston causes a plurality of radially located levers to press against a shaft mounted for reciprocal movement thereby moving it against a spring bias, causing a valve operator pin to move. This pin motion then operates valve means within a hydraulic pilot valve.

Another embodiment of the present invention incorporates a fail-safe feature in an actuator of the same basic design and method of operation through a piston assembly comprised of primary and secondary piston members so arranged so as to provide a secondary fluid chamber between the primary and secondary piston members. This arrangement, coupled with the inclusion of an additional fluid inlet arrangement to the secondary fluid chamber, accomplishes actuation of the device by fluid pressure reaction on either (a) the primary piston whereby the primary and secondary pistons move as a unit to cause movement of the levers by virtue of the secondary piston located between the primary piston and the mechanical lever arrangement, or (b) the secondary piston whereby the secondary piston moves relative to the primary piston to cause movement of the mechanical lever arrangement without necessitating or requiring any movement of the primary piston. With this embodiment, it is further to be noted that by connecting the fluid inlets to separate fluid sources actuation can be accomplished by either of two different fluid sources.

Further aims, objects, and advantages of this invention will appear from a consideration of the following description and the accompanying drawings, showing for purely illustrative purposes embodiments of this invention.

Figure 1:
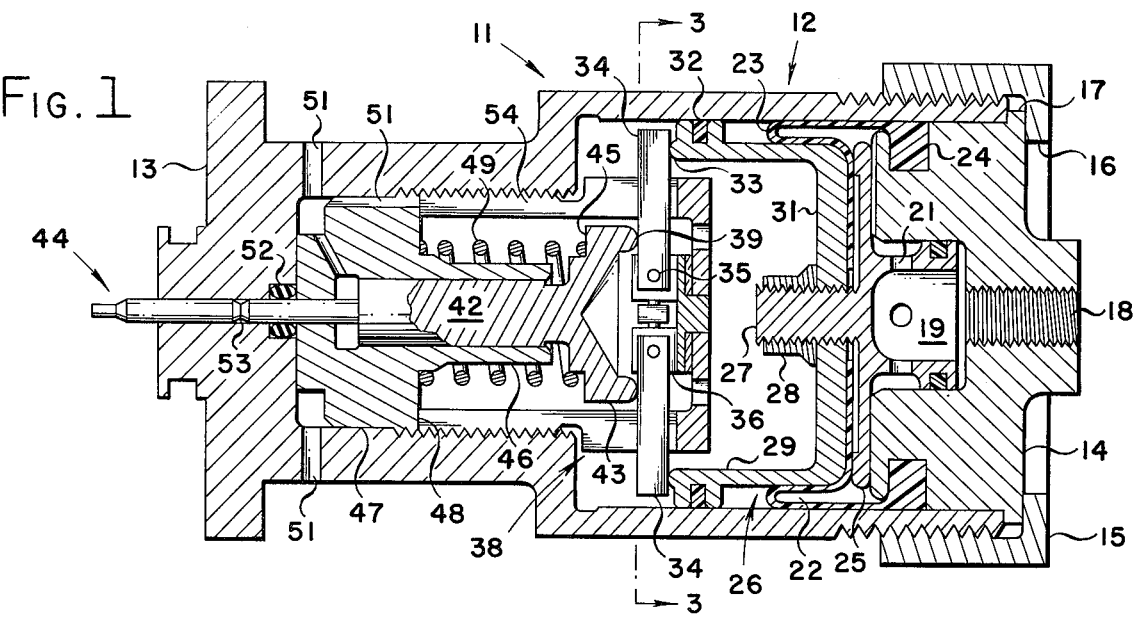
FIG. 1 is a vertical section view of a first embodiment of the actuator of the present invention.
Figure 2:
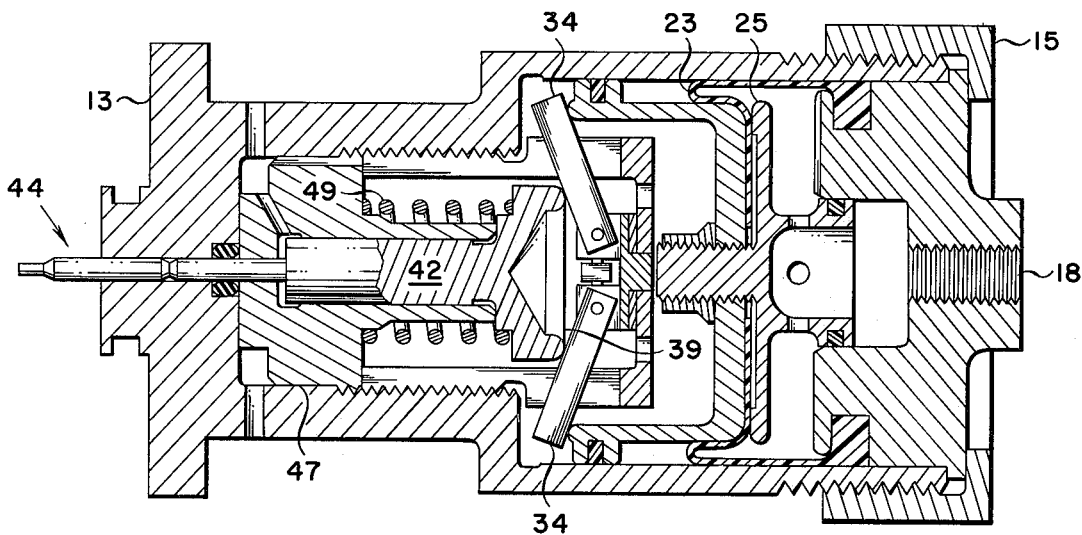
FIG. 2 is a vertical section view similar to that of FIG. 1, however, showing the actuator in its fully extended operative mode.
Figure 3:
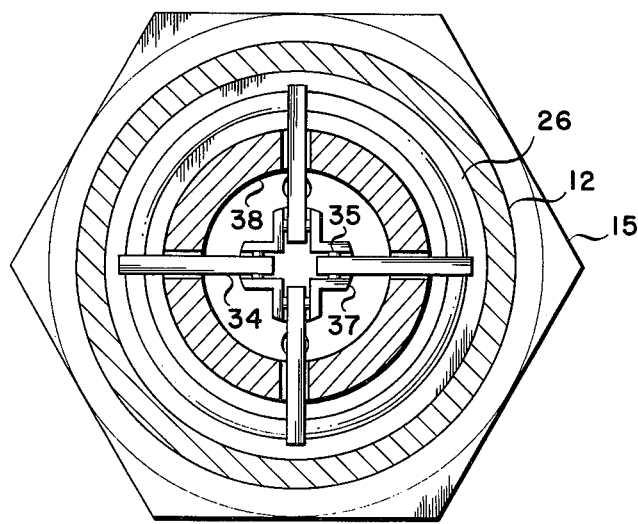
FIG. 3 is a vertical section view taken along lines 3—3 of FIG. 1.

Referring to the drawings wherein like reference characters designate corresponding parts throughout the several figures, and especially to the embodiment shown in FIGS. 1, 2, and 3, the actuator 11 generally comprises a substantially hollow housing 12 having at one end thereof an end cap 13 which may or may not be an integral part of the housing, as the case may be. At the other end of the housing there is a housing closure plug 14. This plug may be frictionally engaged with the interior surface of the housing, since it is held in proper position by a closure plug cap 15 which is threadably engaged about the outer peripheral surface of the housing 12. The closure plug cap 15 maintains the closure plug 14 in proper operative relationship with respect to the housing 12 by the engagement of lips 16 which, when the closure plug cap is threaded upon the housing, will firmly engage the shoulders 17 of the plug 14, thereby drawing it firmly down into the housing 12.

To permit fluid communication with the interior of the housing 12, an axial fluid inlet 18 is bored through the closure plug 14 and threaded to permit interconnection with a suitable fluid supply line. The inlet 18 communicates with the inlet chamber 19 which has a plurality of radially extending fluid ports 21 to allow the operating fluid to be forced into the piston chamber 22. It should be noted at this point that references to the term "fluid" relate to any suitable operating fluid needed to operate such a device as is disclosed herein;

however, it is contemplated that air under pressure will be utilized since it is readily available in the environment in which the invention will be put and is a very convenient medium by which the actuator may be operated.

As the fluid is admitted into the piston chamber 22, it contacts and operates upon the flexible diaphragm 23. The diaphragm has an enlarged portion 24 at one end thereof firmly positioned within the housing closure plug 14 so that the enlarged portion 24 is maintained fixedly therein and prevents flow of fluid between the housing 12 and the closure plug. The other end of the diaphragm is clampingly engaged between the diaphragm clamp 25 and the top portion of the piston 26. As is observable, the diaphragm clamp 25 and the piston 26 are engaged within one another, and thereby when the piston moves so does the clamp, carrying with it one end of the diaphragm 23 so that a completely closed piston chamber 22 is enlargeable upon the admittance of additional operating fluid. In the embodiment shown, the diaphragm clamp, within which is located the inlet chamber 19 and fluid ports 21, is firmly affixed to the piston by means of a stud 27 which projects through the piston 26 and is firmly engaged by nut 28.

The piston 26 is generally a cup-shaped member having a sidewall 29 which projects at right angles to the piston head 31. At the distal peripheral surface of the sidewall of the piston there is located a piston ring 32 performing the normal function which may be expected of a piston ring. The shoulder 33 of the piston bears against a plurality of radially extending lever arms 34 which are pivotally mounted upon pivot pins 35 that engage mounting tabs 36. The mounting tabs are an integral portion of the lever mount assembly 37 which is firmly and fixedly located along the longitudinal axis of the lever retainer housing 38.

When the actuator is in a non-energized state the piston shoulder 33 rests against the radial lever arms 34, which are pointing substantially radially from the axis of the actuator. The lever arms 34 also rest against the lever shoulders 39 of the operating shaft assembly 41.

The operating shaft assembly 41 generally comprises an elongated shaft body 42 having an enlarged head 43 and a slim operating rod 44 at respective ends of the shaft. The head 43 comprises, generally, the lever shoulder 39 and a spring shoulder 45. The entire operating shaft assembly 41 is maintained along the axial center line of the actuator for reciprocative movement by means of the operating shaft bushing 46. The shaft bushing 46 has an enlargement 47 which is frictionally engaged within the lower bore of the housing 12 and is held in that position by the lever housing 38 which is threaded into the mating recesses of the lower housing 12. For example, in FIG. 1 it can be seen that the engaging surfaces 48 of the lever housing 38 firmly press against the enlargement 47 of the shaft bushing.

Maintaining a resilient bias against the spring shoulder 45 of the shaft assembly 41 is a coil spring 49 which maintains pressure of the lever shoulder 39 against the radial lever arms 34 which, in effect, maintain the operating shaft assembly in a retracted position. The spring 49 obviously is coiled about the operating shaft bushing 46. Within the enlargement 47 of the bushing 46 there are a plurality of vents 51, all of which lead to the exterior of the housing 12 for the purpose of equalizing the pressure between the piston 26 and the end cap 13 with that of the ambient atmosphere. The primary reason for this is to prevent pressurization of the operating cavity of the housing when the piston is reciprocated toward the radial lever arms.

The operating rod 44 passes through the enlargement 47 of the shaft bushing and through the end cap 13. To provide a positive seal within the end cap there is positioned about the operating rod an O ring seal 52. In the embodiment shown in FIGS. 1 and 2, the operating rod is in two pieces, as shown by the break point 53, so that precise axial alignment through the end cap is not necessary.

In operation of the embodiment of FIGS. 1-3, operating fluid would be admitted to piston chamber 22 through inlet 18, chamber 19 and fluid ports 21. Volume expansion of chamber 22 due to the operating fluid pressure forces piston 26 to move from the position shown in FIG. 1 toward that shown in FIG. 3. During this movement of piston 26, the radial lever arms 34, with pressure from the piston shoulder 33, are depressed in the direction of movement of the piston and in turn moves the operating shaft assembly 41 through the bushing 46. Because of the high moments of force exerted by the piston 26 on the distal end of each radial lever arm 34, a great mechanical advantage is obtained to overcome the bias of spring 49 upon the operating shaft assembly 41. Therefore, a relatively large movement of the piston 26 exerts sufficient pressure to positively move the operating rod 44 the required shorter distance needed to operate a desired pilot valve. The full actuated position of the operating shaft assembly 41 is shown in FIG. 2, with the radial lever arms 34 moved in their respective lever slots 54 the required amount to effect complete movement of the operating shaft assembly 41. Once the operating fluid pressure in the inlet 18 is removed, the stored fluid is allowed to vent back through the inlet 18, releasing the pressure upon the piston 26, whereupon the shaft assembly spring 49 repositions the radial lever arms and the piston to the position of FIG. 1.

Figure 4:
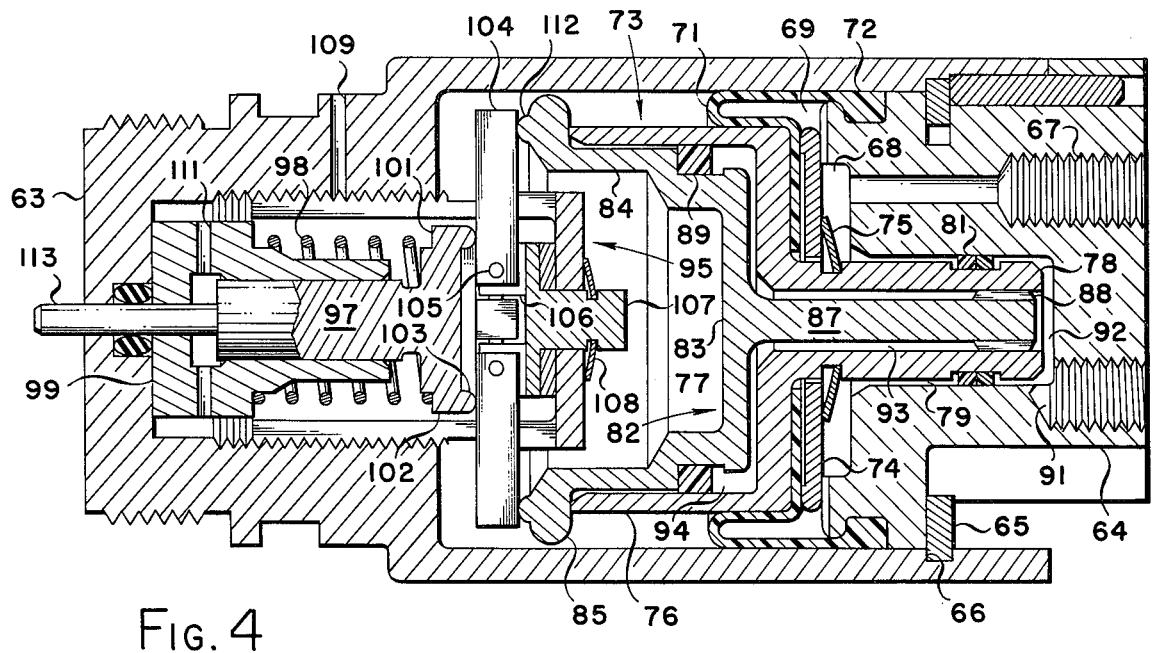
FIG. 4 is a vertical section view of a second embodiment of the actuator of the present invention.
Figure 5:
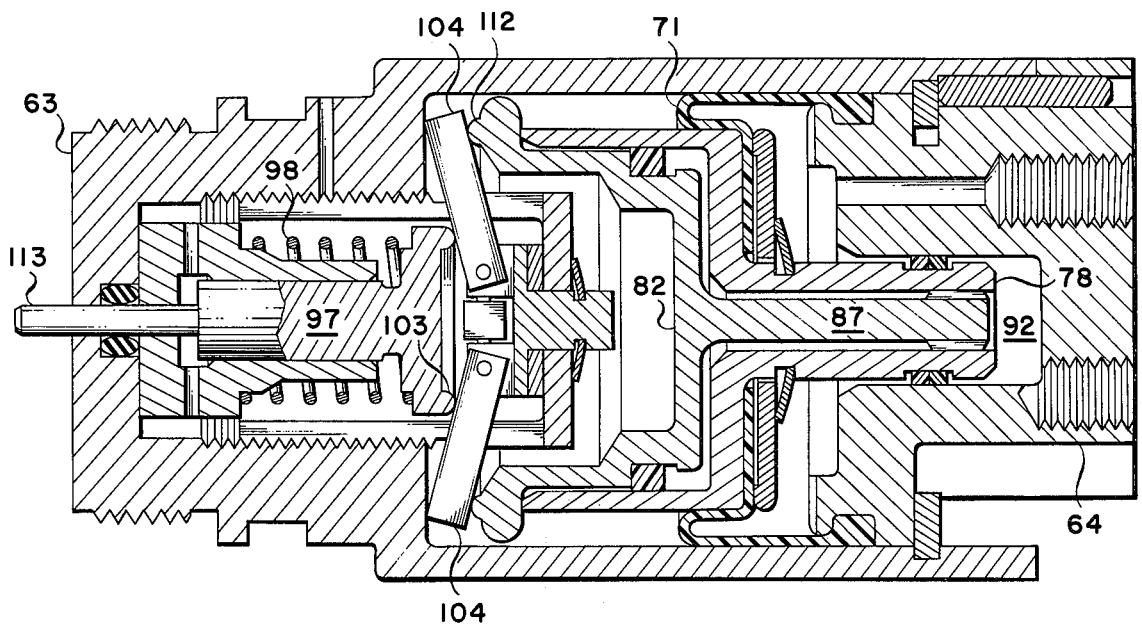
FIG. 5 is a vertical section view similar to that of FIG. 4, showing the second embodiment in the fully extended operative mode.

Referring now to FIGS. 4 and 5, showing a second embodiment of this invention, it can be seen that the actuator shown is quite similar to that shown in FIGS. 1-3, with the exception that this embodiment entails a fail-safe mechanism utilizing primary and secondary piston assemblies, which either together or by one independently, are capable of operating the radial lever arms and consequently moving the operating rod. Generally, the second embodiment actuator 61 comprises a cylindrical tubular housing 62 having an end cap 63 and a housing closure plug 64. The closure plug 64 may be held firmly in operative relation with the housing 62 by means of a snap ring 65, which resides in grooves 66 of the interior surface of the housing.

Within the closure plug 64 is a primary operating fluid inlet 67 which allows the input of operating fluid, preferably air, into the inlet chamber 68 and the primary piston chamber 69. At this point, the operating fluid is confined by the flexible diaphragm 71, which is held in position by an enlarged portion 72 clamped between the closure plug and the housing. The other end of the diaphragm 71 is held in a clamped engagement between the top surface of the primary piston 73 and a diaphragm clamp 74, which is maintained firmly against the diaphragm by means of a clamping ring 75.

The primary piston 73 generally comprises a cup-shaped piston member having a sidewall 76 depending from the piston head 77. At the central portion of the piston head there is attached a hollow tubular piston shaft 78 extending rearwardly of the piston 73 into a recess 79 within the closure plug 64. To maintain a fluid tight seal within the recess 79, the piston shaft 78 is provided with suitable shaft seals 81.

Located concentrically with the primary piston 73 is a secondary piston 32. This piston is generally of cuplike configuration and has a piston head 83 with a depending sidewall 84. The peripheral edge of the sidewall 84 has a radially projecting shoulder 85 against which rests the peripheral edge of the primary piston sidewall 76. At the center of the piston head 83 there is a rearwardly projecting shaft 87 concentrically placed within primary piston shaft 78 for reciprocative movement. This shaft also has a suitable bushing 88 to maintain the concentricity of the shaft 87 within the shaft 78. In order to maintain a fluid tight seal between the sidewalls of each of the respective pistons, both the primary and secondary pistons, there is provided a fluid seal 89 attached to the outermost surface of the sidewall 84 of the secondary piston 82.

For operation of the secondary piston 82, operating fluid is supplied through the secondary inlet 91 into receiving chamber 92, and thence through the passage 93 between shafts 78 and 87 into the secondary piston chamber 94 where it operates upon the piston head 83.

Located near the end cap portion of the housing is a threaded bore into which is threaded a lever retaining housing 95 which maintains, in frictional engagement at the distal end of the bore, an operating shaft bushing 96. Located for reciprocative movement within the bushing 96 is the operating shaft assembly 97. As in the case of the first embodiment, the operating shaft assembly 97 reciprocates within the bushing 96 and is spring biased by operating shaft spring 98, which rests at one end thereof against the enlarged portion 99 of the bushing and at the other end against the spring shoulder 101 of the operating shaft assembly head 102.

The lever shoulder 103 of the shaft assembly head bears against the proximal end of each of the radial lever arms 104, which are mounted about pivot pins 105. Each pivot pin is affixed to a mounting tab 106 of the lever mount 107. The lever mount 107 is firmly attached to the retainer housing 95 by means of a fastener 108 which engages the projecting shaft of the mount.

As was noted in the previous embodiment of FIGS. 1–3, the present embodiment also provides for a venting system to vent the interior of the actuator 61 to the ambient atmosphere so that when the pistons move upon activation, there will be no compressive forces on the sides of the piston opposite the operating fluid. In this regard, vents 109 in the sidewalls of the housing 62 vent the interior of the actuator, along with vents 111 which vent the portion enclosed between the shaft 97 and the enlarged portion 99 of the operating shaft bushing.

In the operation of the second embodiment, the primary purpose is to provide a fail-safe system, so that should the primary piston and its associated flexible diaphragm fail to operate, the secondary piston will be fully able to carry forth the assigned task of the actuator. In this regard, the preferred mode of operation would be to supply operating fluid through the primary inlet 67 to fill the chamber 69 and obviously drive the primary piston toward the radial levers 104. As the primary piston 73 is driven toward the radial levers, it necessarily carries with it secondary piston 82. As this motion takes place, the shoulder projections 112 bear against the radial lever arms 104, thereby rotating them and firmly engaging the lever shoulder 103 of the operating shaft assembly head 102. This, in turn, compresses the spring 98 and allows the operating rod 113 to be moved through the end cap 63. Upon venting of the operating fluid back through the primary inlet 67, a compressed spring 98 will return all the components to the non-actuated pistons shown in FIG. 4.

However, should the primary piston and the associated parts therewith fail to function, or should a leak develop within this system, operating fluid may be supplied through the secondary inlet 91 to pass through passage 93 into the secondary piston chamber 94, thereby exerting sufficient force upon the piston head 83 of the secondary piston to move the secondary piston toward the radial lever arms and to compress the spring 98 to allow the operating rod 113 to be actuated, as previously described. In this mode of operation, primary piston 73 would not necessarily be moved with the secondary piston, except from the possible frictional forces from the interengagement between the two pistons of the annular seal 89 which may possibly carry the primary piston with the secondary piston. Upon the release of the operating fluid from the secondary inlet 91, the parts of the actuator would return to the original position, as described before. Therefore, it may be seen that the embodiment of FIGS. 4 and 5 provides a failsafe system which is completely operable should the primary mode of operation fail. Also, it may further be seen that the embodiment of FIGS. 4 and 5 can be actuated by either of two different fluid sources by connecting fluid inlets 67 and 91 to separate fluid pressure sources.

What is claimed is:

1. A low, fluidic pressure operated force amplifying actuator comprising: a hollow housing, the interior of the housing being compartmented into a fluid receiving compartment portion and an operating compartment portion vented to the ambient atmosphere; piston means including an assembly of concentrically mounted primary and secondary piston members each having a sidewall and adapted for reciprocation within the housing during ingress and egress of low, fluidic pressures into and from said fluid receiving compartment portion; an impervious flexible diaphragm positioned between and connected to the sidewall of the housing and the primary piston member forming with the piston means a first fluid receiving compartment and providing a fluid tight seal between the first fluid receiving compartment and the operating compartment; a seal means between the confronting sidewalls of the concentric primary and secondary piston members forming in conjunction with the primary and secondary piston members a second fluid receiving compartment and providing a fluid tight seal between the second fluid receiving compartment and the operating compartment, said second fluid receiving compartment distinct from and without direct communication with the first fluid receiving compartment; a first means for admitting low, fluidic pressure into said first fluid receiving compartment; a second means for admitting low, fluidic pressure into said second fluid receiving compartment, said second means separate from said first means; an operating rod means within the operating compartment and reciprocable along with said piston means during ingress and egress of low, fluidic pressures into either of the first and second fluid receiving compartments, the operating rod means having a portion thereof extending exteriorly of the housing and includes a spring biasing means so that the operating rod means is normally spring biased toward the piston means; and force amplifying motion transmitting means interposed between the piston means and the operating rod means whereby when low, fluidic pressures are admitted to either of the first and second fluid receiving compartments the piston means moves the motion transmitting means to cause the operating rod to move, the spring biasing means on the operating rod means maintaining the operating rod means in operational contact with the motion transmitting means and the motion transmitting means in operational contact with the piston means, said primary and secondary piston members structural relationship providing the only operational contact of the piston means with the motion transmitting means being by the scondary piston member whereby movement of the motion transmitting means resulting from admission of pressure into the first fluid receiving compartment is accomplished by concurrent movement of the primary and secondary piston members as a unit and movement of the motion transmitting means resulting from admission of pressure into the second fluid receiving compartment is accomplished by movement of the secondary piston member only.

2. A low, fluidic pressure operated force amplifying actuator as claimed in claim 1, wherein the motion transmitting means includes a lever mounting means centrally located within the operating compartment, a plurality of radially extending lever arms pivotally mounted at the proximal ends thereof upon the lever mounting means, said secondary piston member contacting a first side of the lever arms substantially near the distal ends thereof for the operational contact therebetween, the operating rod means having a head portion with a projecting lever shoulder, the lever shoulder contacting the side of the lever arms opposite said first side thereof at a point between the proximal ends of the lever arms and the area of contact of the secondary piston member with the lever arms for the operational contact between the operating rod means and the motion transmitting means.

* * * * *